W. Trowbridge.

Cotton Bale Tie.

No. 3,337. Reissued Mar. 23, 1869.

Witnesses:
H. A. Davis
Geo. W. Rothwell

Inventor:
W. Trowbridge
by J. Fraser & Co.
Attorneys

N. PETERS, PHOTO-LITHOGRAPHER, WASHINGTON, D. C.

UNITED STATES PATENT OFFICE.

DANIEL C. LOWBER, OF NEW YORK, N. Y., AND GEORGE L. LAUGHLAND, OF NEW ORLEANS, LA., ASSIGNEES, BY MESNE ASSIGNMENTS, OF WILLIAM TROWBRIDGE.

IMPROVED COTTON-BALE TIE.

Specification forming part of Letters Patent No. 75,319, dated March 10, 1868; Reissue No. 3,337, dated March 23, 1869.

*To all whom it may concern:*

Be it known that WILLIAM TROWBRIDGE, of the city of New Orleans, parish of Orleans, and State of Louisiana, did invent a certain new and useful improved device for fastening the ends of wire or wire rope together, when the same is used for banding cotton or other bales; and we do hereby declare the following to be a full, clear, and exact description of the same, reference being had to the annexed drawings, making a part of this specification, in which—

Figure 1:
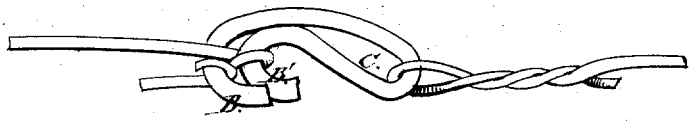
Figure 2:
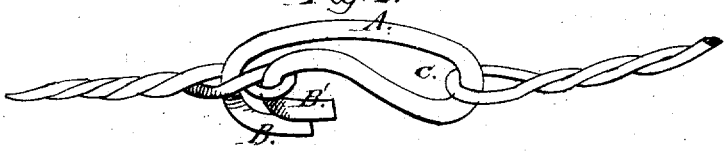
Figure 3:
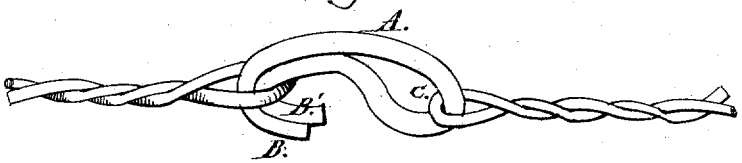
Figure 4:
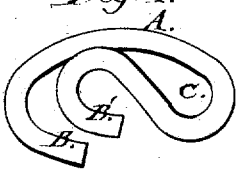

Figures 1, 2, and 3 are views of the device as it appears when fastening together the end of a band, and Fig. 4 is a detached view of the hook separated.

The invention consists simply in the employment of a section or piece of iron wire preferably somewhat larger than the wire that is to be used as a band in connection with it, (in order to prevent a too abrupt bending of the band in attaching the two together,) that is so bent or formed as to duplicate the hook at one of its ends, and form a loop or eye at the other.

But the invention will be better understood and more readily explained by referring to the drawings, on which—

A is a piece of wire, about three and a half or four inches long. B B′ are the hooks, and C the loop or eye, to which we have referred.

The device may be formed by machines especially constructed for the purpose, which, at a single operation, cut off the wire the right length and put it into shape, as seen in the drawings.

In applying the invention to actual use, one end of the band is first connected with the hook by passing the same through eye C and then folding it over and twisting it, as is shown in Fig. 1. This attachment of the device to one end of the band may be done at the factory or on the plantation. This being done, the band is made to encircle the bale, and the free end is fastened to the device by passing it through and around the hooks, as shown in the drawings, until sufficiently engaged to not be withdrawn by the strain exerted upon it by the expansion of the material of the bale. This may be accomplished by one or two twists of the wire after passing it through the hook; but if the tension be great, a repetition of the coils or turns of the free end may be necessary, as shown in the drawings.

When bales are made up of irregular sizes, it is preferable to leave the free end unbent until the band has been placed around the hoop; but for many purposes, where bales are made of a uniform weight and size, as those of cotton and hay usually are, it is more convenient and expeditious to have the free end of the wire coiled or twisted in advance, to be in readiness to engage with the hooks at once when applied to the bale. This may be done at the factory or shop, and save much time in the operation of baling, as well as insure a greater certainty against the band becoming unfastened through hasty and imperfect twisting in the act of baling. When done in this manner the coiling of the end of the wire upon the free portion of the band is such as to leave the coil or loop sufficiently open to allow it to be readily slipped over the hook.

If the wire is sufficiently light and flexible, the coil may receive a half-twist as the hook is inserted, so that each part of the hook lies in a separate loop, as in Fig. 2, or both parts of the hook may be passed through the loop together.

With this fastening there is no difficulty in taking the band off the bale without cutting it whenever the bale is to be broken up. This peculiarity constitutes one of the points of greatest comparative merit in the invention, for it secures the band for repeated use.

The device may be made as cheaply as any in existence, and there is none other that is simpler and easier of adjustment to practical use.

What is claimed as the invention of the said WM. TROWBRIDGE is the device herein described, to wit:

A section or piece of wire so formed as to be provided with the loop or eye C, with the two ends bent into hook form, substantially as herein described, for the purpose set forth.

D. C. LOWBER.
GEO. L. LAUGHLAND.

Witnesses for D. C. Lowber:
J. FRASER,
K. JONES.

Witnesses for G. L. Laughland:
MICHAEL L. LUTHER,
LAURENCE MCCORMACK.